3,137,185
METHOD FOR ROLLING THREAD FORMS HAVING EXTREMELY HIGH HELIX ANGLES
Harry Glicken, 284 Meeker Ave., Newark, N.J.
Filed Apr. 26, 1961, Ser. No. 105,752
4 Claims. (Cl. 80—61)

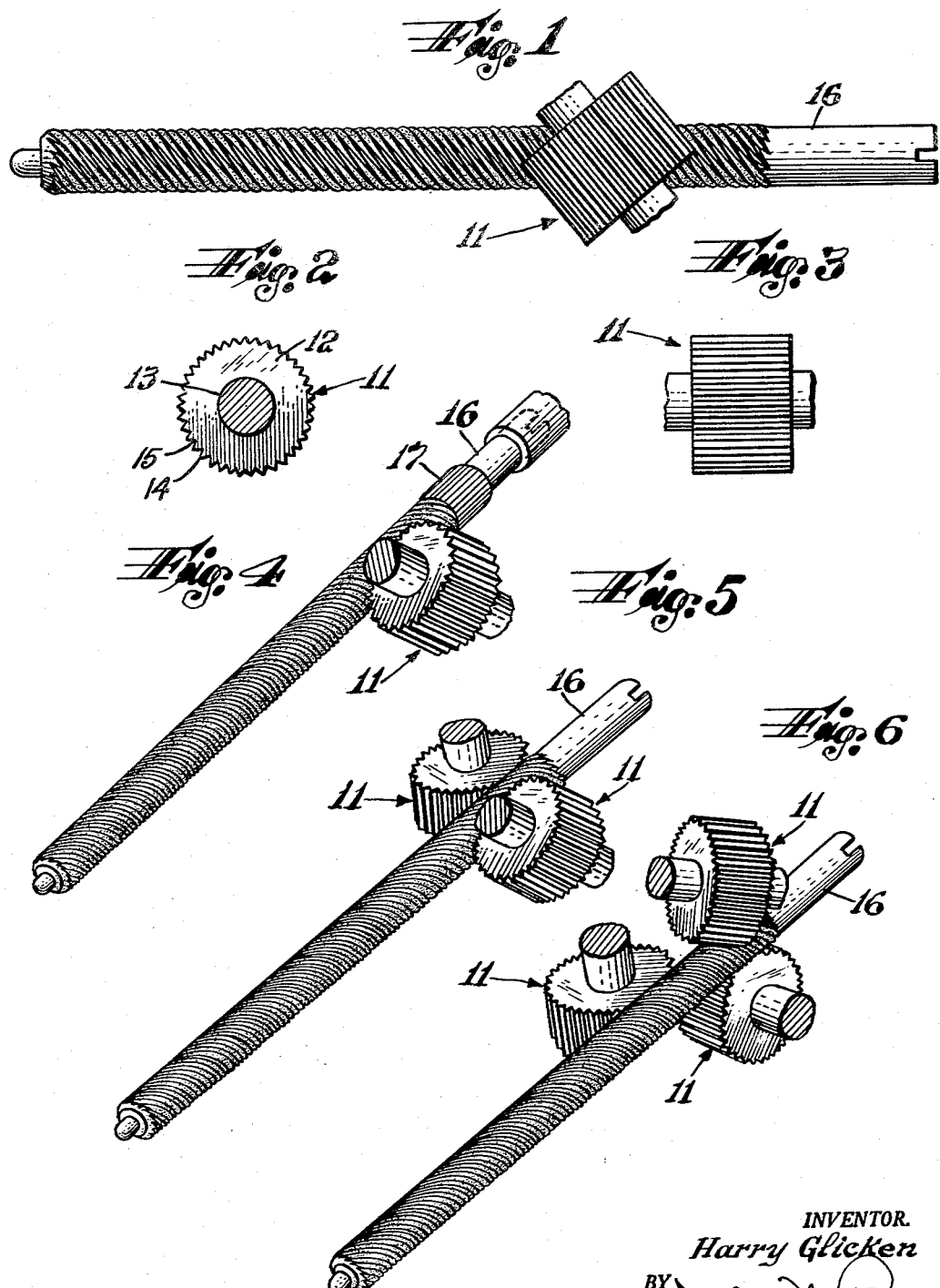

My invention relates generally to generating threads and specifically to a method for rolling continuous threads, of optional form and having an extremely high helix angle, on rod-stock.

The so-called lead screw is widely employed today as a transport mechanism. For instance, dictating machines, variable capacitors, variable resistors, potentiometers and similar machines employ the lead screw expedient to progressively transport one element across another. The dictating machine employs the lead screw to transport the recording stylus laterally across some recording means such as a belt or a cylinder. In the variable capacitor, plates are progressively telescoped between each other by means of a lead screw. The variable resistor employs the lead screw to carry a contact across a resistance coil. In each of the above applications, the lead screw must transport an element in a precise manner without lateral play in order to insure operating reliability. Thus, the transport must be engaged on the lead screw so that there is a minimum of tolerance between the mating parts. Moreover, in many applications, the helix angle of the screw must be extremely large. However, there is no practical and economical method known today to make lead screws having extremely high helix angles for which a tightly fitting nut may be fabricated while maintaining complete interchangeability between the nuts and lead screws.

Lead screws may be made by one of two basic methods; cutting or rolling. The screw machine generates the thread from by progressively engaging a cutting tool to rotating rod-stock along its longitudinal axis. This will produce a single, helical thread form. In some instances, the cutter rotates about the rod-stock while progressing along its longitudinal axis.

In order to produce a multiple-start, lead screw on a screw machine, the machine must be indexed or special cutting dies or chasers in a die head must be employed. Indexing involves two inherent sources of error: setting the distance between starts and tolerances in the screw machine head. In addition, most screw machines employ a lead screw to transport the cutter along the longitudinal axis of the stock. This top, involves certain inherent errors due to tolerances in the screw machine's lead screw or other transporting mechanism. When the helix angle of the lead screw produced is small, these errors are of little consequence. However, with high helix angles, these errors are multiplied many times. This results in a product having its own peculiarities, no two being precisely the same. It is, therefore, impossible to provide a nut which will fit every lead or feed screw tightly yet be completely interchangeable. If interchangeability is essential, the nut must be tapped oversize and fits loosely. If tightness is essential, the nut must be cast to the particular lead screw to which it is to be engaged. If both qualities are essential, the screw machine expedient cannot be employed. If hand mating is employed, there is an enormous rejection rate.

Another impediment to the screw machine expedient is the fact that the grinding process cannot produce the micro-finish of the rolling process, nor are ground threads as strong as rolled threads. However, while rolled threads are strong and have a fine micro-finish, there are a number of serious limitations to the rolling expedient for producing thread forms having extremely high helix angles.

The annularly-grooved die may be employed to roll thread forms having relatively low helix angles but is extremely limited when employed to produce thread forms having high helix angles of the order of 5 degrees or more. For each annularly-grooved die, a fixed relationship exists between the helix angle and the diameter of the rod-stock employed. This relationship must be maintained in order to produce a continuous thread. Lead is equal to the pitch times the number of starts. The number of starts is a function of the diameter of the rod-stock and the spacing between individual threads on the die. Therefore, for rod-stock of a given diameter, a particular die is able to produce a thread form having only one helix angle. If the die is rotated to increase the helix angle beyond that for which it was intended, the thread form produced will be discontinuous, appearing as a helical stripe consisting of grooves progressing longitudinally along the axis of the stock. Annularly-grooved dies that can be accommodated by available machinery, cannot produce thread forms having high helix angles of the order of approximately 15 degrees or more. Therefore, the annularly-grooved die cannot be employed in many instances.

Multiple-start dies may be employed for both in-feed and through-feed rolling of rod-stock. In the case of the multiple-start, in-feed die rolling of threads, the die must be as wide as the thread is long. This requires specially ground, enormously costly oversized dies for even relatively short thread lengths. Moreover, such oversized dies cannot be accommodated by existing machinery. Therefore, the multiple-start, in-feed expedient is economically impractical for producing lead screws having such high helix angles.

It is theoretically possible to employ a multiple-start, through-feed die to roll threads having a high helix angle. However, the rate of feed must necessarily be extremely slow. In addition, the helix angle of all multiple-start dies is fixed and cannot be altered. Therefore, a separate die must be employed for each helix angle desired. Thus, the multiple-start die, whether in-feed or through-feed, is not feasible for rolling threads having extremely high helix angles.

Therefore, it is among the objects and advantages of my invention to provide a method for rolling thread forms having extremely high helix angles.

Another object of my invention is to provide a method for rolling thread forms having extremely high helix angles in which the thread form is continuous.

A further object of my invention is to provide a method for rolling thread forms having extremely high helix angles for which a nut may be produced which will be both tightly fitting and fully interchangable between threads produced thereby having the same form and helix angle.

Yet another object of my invention is to provide a method for rolling thread forms having extremely high helix angles in which the angular displacement between each thread start is precisely the same.

Still a further object of my invention is to provide a method for rolling thread forms having extremely high helix angles in which the same die or dies can produce threads having widely varying leads.

Yet a further object of my invention is to provide a method for rolling thread forms having extremely high helix angles in which there is no fixed relationship between the diameter of the rod-stock and the helix angle produced thereby.

Another object of my invention is to provide a method for rolling thread forms having extremely high helix angles which may employ extremely inexpensive, easily fabricated, relatively small dies.

Yet another object of my invention is to provide a method for rolling thread forms having extremely high helix angles which may employ dies accommodated by existing machinery.

Still another object of my invention is to provide a method for rolling thread forms having extremely high helix angles in which the feed rate is extremely high.

These objects and advantages as well as other objects and advantages may be achieved by my invention various embodiments of which are illustrated in the drawings in which:

FIGURE 1 is a side elevational view of a lead screw produced by my method.

FIGURE 2 is a side elevational view of an axially-grooved die employed by my method.

FIGURE 3 is an end elevational view of the die illustrated in FIGURE 2.

FIGURE 4 is a view in perspective illustrating a method for rolling rod-stock with a single, axially-grooved die.

FIGURE 5 is a view in perspective illustrating a method for rolling rod-stock with two, diametrically opposed, axially-grooved dies.

FIGURE 6 is a view in perspective illustrating a method for rolling rod-stock with three axially-grooved dies.

My method employs an axially-grooved die 11 comprising a cylindrical body 12 having an axial shaft 13. The periphery of the die 11 is provided with a plurality of generally equally spaced, parallel, axial ribs 14 and grooves 15. The particular form of the ribs 14 and grooves 15 is optional depending upon the particular form of the thread desired.

Either one or a plurality of axially-grooved dies may be employed. The helix angle produced by the die is determined by the angle between the ribs 14 and grooves 15 of the die 11 and the longitudinal axis of the rod-stock 16. The die 11 is pressure engaged to the rod-stock 16 and relative rotational movement maintained therebetween. Simultaneously, relative longitudinal movement is maintained between the die 11 and the rod-stock 16.

In one embodiment of my invention illustrated in FIGURE 4, a single axially-grooved die 11 is employed. The stock 16 is maintained in pressure engagement with the die 11 which is rotatably mounted in a fixed head, by means of a bushing 17 through which the unthreaded stock 16 passes immediately before engaging the die 11. In the alternative, the unthreaded stock may be held by a V-shaped trough or a pair of rollers engaged therewith immediately before the die and opposed thereto. Either or both of the rod-stock 16 and the die 11 may be force-rotated. For instance, the die 11 may be mounted in a fixed head and the rod-stock 16 force-rotated by means of a turret lathe. The rotating stock 16 is fed longitudinally past the idler rollers or through the trough or bushing as the case may be and past the die 11 which idly rotates in response thereto. The die 11 may be force-rotated rather than the stock 16 or both may be rotated simultaneously. However, simultaneous rotation requires careful timing and is unnecessary.

In every embodiment of my invention, the die or dies rotate about it or their own axis. In addition, there is maintained a relative revolutionary movement between the axis of each die and the surface of the rod stock. This relative revolutionary movement may be produced by either rotating the rod stock about its own axis while holding the axis of the respective dies immovable or by holding the rod stock against rotation about its own axis and rotating the axis of the respective dies about the surface of the rod stock. Of course, each of these means may be used simultaneously. While the relative rotational and revolutionary movement between the dies and the rod stock is being maintained, the rod stock is translated past the die or the dies past the rod stock at a velocity no greater than the normal translational velocity generated by the inter-rotation and revolution of the dies with the stock. This translational movement may be produced by applying translational pressure to the rod stock forcing it past the dies or by holding the rod stock longitudinally immovable and forcing the dies along the rod stock parallel to the axis of the rod stock.

In another embodiment of my invention illustrated in FIGURE 5, a pair of diametrically opposed, axially-grooved dies 11, 11 are employed. The ribs of the dies 11 engage the rod-stock 16 tangentially, the point of tangency on each rib being at its center and lying on an axis passing through the longitudinal axis of the stock 16 and perpendicular thereto. In this case, since the dies 11, 11 oppose each other, no opposing support is necessary. Here too, either or both of the dies 11, 11 and the rod-stock 16 may be force-rotated as relative longitudinal movement is maintained between the dies 11, 11 and the rod-stock 16.

Another embodiment of my invention is illustrated in FIGURE 6 in which three axially-grooved dies are employed. The ribs of the dies 11 are tangent to the rod-stock 16 at their rib centers, the points of tangency being separated by approximately 120 degrees and each lying in a plane perpendicular to the longitudinal axis of the rod-stock 16. The dies 11 may be mounted on a force-rotated head with the rod-stock being fed longitudinally through the space between the dies 11. Of course, the mounting head for the dies 11 could be moved longitudinally along the axis of the stock 16. In the alternative, the rod-stock 16 is force-rotated and fed between the dies 11 which are mounted in a fixed head for idle rotation.

In each instance, simultaneous relative rotational and relative longitudinal movement is maintained between the die 11 and the rod-stock 16 to produce the thread form.

My method may be employed to produce thread forms having any desired helix angle no matter how great by merely increasing or decreasing the angle between the ribs 14 on the die 11 and the longitudinal axis of the rod-stock 16. In addition, the dies 11 may be mounted on any suitable head for either forced or idle rotation. The stock 16 may be mounted in any manner suitable to feed it past the die 11. If the stock 16 is to be force-rotated, it can be conveniently mounted in a turret lathe or any other machine which will impart rotation to it. The rate of feed is dependant merely upon the force with which relative longitudinal movement is maintained between the die 11 and the stock 16. In addition, the thread form may have any length, being limited only by the length of the stock 16.

The product produced by my method is a continuous, helical thread form of any desired configuration, any desired lead, any desired number of starts, any desired pitch and any desired helix angle which may be applied to rod stock having any desired diameter. The angle between each start is precisely the same since errors in the angle between each individual rib on the die are averaged by reason of the fact that the die passes over each point along the length of the stock a great many times. A nut may be easily fabricated for my thread form which is both tight fitting and completely interchangeable with other screws produced by my method having the same configuration and lead.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:

1. A method for rolling thread forms having extremely high helix angles comprising,
engaging a generally cylindrical, axially grooved die to unthreaded rod-stock,
orienting the axis of the die with respect to the longitudinal axis of the rod-stock to any chosen angle greater than 0° and less than 90°,
rotating the die about its axis,
producing relative revolutionary movement between the axis of the die and the surface of the rod stock,
simultaneously progressively moving the point of engagement between the die and the rod-stock along the length of the rod-stock at a velocity no greater than the normal translational velocity generated by the inter-rotational and revolutionary movement between the die and the rod stock,
thereby to produce a continuous helical thread form.

2. A method for rolling thread forms having extremely high helix angles comprising,
(a) engaging a pair of diametrically opposed dies to the rod stock, each die having a generally cylindrical body and a plurality of ribs and grooves equally spaced about its periphery parallel to the axis of the die, each die being engaged to the rod stock with sufficient pressure to cause the ribs of the dies to deform the surface of the rod stock,
(b) orienting the ribs and grooves on one die with respect to the longitudinal axis of the rod stock to a chosen angle greater than 0° and less than 90°,
(c) orienting the ribs and grooves on the opposed die with respect to the longitudinal axis of the rod stock to an angle equivalent to the supplement of the angle between the ribs and grooves on the first mentioned die and the axis of the rod stock,
(d) rotating the dies about their axis,
(e) producing relative revolutionary movement between the axes of the dies and the surface of the rod stock,
(f) simultaneously progressively moving the point of engagement between the dies and the rod stock along the length of the rod stock at a velocity no greater than the normal translational velocity generated by the inter-rotational and revolutionary movement of the dies with the rod stock,
(g) thereby to produce a continuous, helical thread form on the rod stock.

3. A method for rolling thread forms having extremely high helix angles comprising,
(a) engaging a plurality of dies to the rod stock, each die having a generally cylindrical body and a plurality of ribs and grooves equally spaced about its periphery parallel to the axis of the die, each die being engaged to the rod stock with sufficient pressure to cause the ribs of each die to deform the surface of the rod stock,
(b) orienting the ribs and grooves on each die with respect to the longitudinal axis of the rod stock to identical chosen angles greater than 0° and less than 90°,
(c) rotating the dies about their axis,
(d) rotating the rod stock about its axis,
(e) simultaneously progressively moving the point of engagement between the dies and the rod stock along the length of the rod stock at a velocity no greater than the normal translational velocity generated by the inter-rotational and revolutionary movement of the dies with respect to the rod stock,
(f) thereby to produce a continuous, helical thread form on the rod stock.

4. A method for rolling thread forms having extremely high helix angles comprising,
(a) engaging a plurality of dies to the rod stock, each die having a generally cylindrical body and a plurality of ribs and grooves equally spaced about its periphery parallel to the axis of the die, each die being engaged to the rod stock with sufficient pressure to cause the ribs of each die to deform the surface of the rod stock,
(b) orienting the ribs and grooves on each die with respect to the longitudinal axis of the rod stock to identical chosen angles greater than 0° and less than 90°,
(c) rotating the dies about their axis,
(d) revolving the axes of the dies about the rod stock,
(e) simultaneously progressively moving the point of engagement between the dies and the rod stock along the length of the rod stock at a velocity no greater than the normal translational velocity generated by the inter-rotational and revolutionary movement of the dies with the rod stock.

References Cited in the file of this patent

UNITED STATES PATENTS

| | | |
|---|---|---|
| 118,318 | WickerSham | Aug. 22, 1871 |
| 312,084 | Caualli | Feb. 10, 1885 |
| 315,144 | Jones | Apr. 7, 1885 |
| 357,002 | Harvey | Feb. 1, 1887 |
| 541,551 | Johnson | June 25, 1895 |

FOREIGN PATENTS

| | | |
|---|---|---|
| 183,629 | Austria | Mar. 15, 1955 |
| 825,390 | Germany | Dec. 7, 1953 |